Patented Oct. 7, 1930

1,777,459

UNITED STATES PATENT OFFICE

JAMES BADDILEY AND ERNEST CHAPMAN, OF BLACKLEY, MANCHESTER, ENGLAND, ASSIGNORS TO BRITISH DYESTUFFS CORPORATION LIMITED, OF MANCHESTER, ENGLAND

MANUFACTURE OF ABSORBENT MATERIALS

No Drawing. Application filed July 14, 1927, Serial No. 205,834, and in Great Britain July 15, 1926.

The present invention relates to improvements in the manufacture of absorbent materials of porous or pervious nature for enhancement of their absorbent powers; enabling them to take up liquids more readily. The invention is applicable to any porous absorbent material whether composed of textile or fibrous substances, such as, cotton wadding, blotting paper, duplicating paper, etc., or powders, such as kieselguhr, and the like, and it consists in impregnating such materials with a small proportion of a high molecular sulphonic acid or a salt thereof, for example, a sulphonic acid of an aromatic, hydro-aromatic, aliphatic-aromatic or polynuclear hydrocarbon. We have found that materials thus treated have their absorbent properties greatly improved. The impregnation can be carried out at any convenient stage of the manufacture of the material or article in question, and can generally be brought about most easily by treating the material in question with an aqueous solution of a soluble salt of the sulphonic acid, the impregnated material being afterwards dried.

Among the materials particularly suitable for the purpose specified, we may instance the sulphonic acid (or salts thereof) of naphthalene containing one or more aliphatic side chains, but the type of material we find most advantageous is that obtained by sulphonating certain petroleum fractions and condensing with alcohols by the process described in our copending application Serial No. 195,585, filed May 31, 1927.

As set forth in that application, we have found that mineral oil fractions having a boiling point range between 150° and 300° C. may be converted into materials having valuable wetting-out properties, (that is facilitating the wetting of fibrous materials by liquid material) by sulfonating the oil and subsequently condensing with an alcohol, such as iso-propyl alcohol. The product may be obtained by extracting an oil with liquid sulfur dioxid, and then heating the extract with monohydrated sulfuric acid or weak oleum for several hours. Thereafter the alcohol, together with sulfuric acid, is added, and the heating continued for about three hours. The desired materials may be obtained in the form of a sodium salt by treating the acid with lime and then converting the lime salt into the sodium compound in an ordinary manner. If desired, the solution of the sodium salt may be evaporated, giving a light gray water-soluble powder as the final product.

In another copending application, Ser. No. 205,833, we have described a process for obtaining like products, which consists in selecting an oil having a boiling range of say 200° to 300° C., and sulphonating in a manner similar to that just described. When using such a fraction of oil, it is possible to obtain materials having good wetting-out properties without resorting to the additional step of condensing with an alcohol. Compounds made according to either of our stated copending applications may be employed for the purposes of impregnation as set forth herein.

What we claim and desire to secure by Letters Patent is:—

1. As a new composition of matter, a dry porous absorbent material of increased absorbent properties, said material containing as an impregnant a high molecular sulphonic acid.

2. As a new composition of matter, a dry porous absorbent material of increased absorbent properties, said material containing as an impregnant a sulphonated alkylated petroleum fraction.

3. As a new composition of matter, a dry porous absorbent material of increased absorbent properties, said material containing as an impregnant a sulphonated isopropylated petroleum fraction.

4. As new composition of matter, dry absorbent paper containing in its substance as an impregnant a sulphonated isopropylated petroleum fraction.

5. A process for making absorbent materials of enhanced absorbent power which comprises impregnating a porous substance with a solution of a high molecular sulphonic acid and drying.

6. A process for making absorbent materials of enhanced absorbent power which comprises impregnating a porous substance with a high molecular sulphonic acid in the form of its salt and drying.

7. A process for making absorbent materials of enhanced absorbent power which comprises impregnating a porous substance with a sulphonated alkylated petroleum fraction and drying.

8. A process for making absorbent materials of enhanced absorbent power which comprises impregnating a porous substance with a sulphonated isopropylated petroleum fraction and drying.

9. As a new composition of matter, a dry porous absorbent material of increased absorption, said material containing as an impregnant a high molecular sulphonic acid in the form of a soluble salt.

In testimony whereof we affix our signatures.

JAMES BADDILEY.
ERNEST CHAPMAN.